United States Patent

[11] 3,582,768

| [72] | Inventors | William R. Watson |
|---|---|---|
| | | Oaklawn; |
| | | James J. Moran, Matteson, both of, Ill. |
| [21] | Appl. No. | 834,981 |
| [22] | Filed | June 20, 1969 |
| [45] | Patented | June 1, 1971 |
| [73] | Assignee | Nalco Chemical Company |
| | | Chicago, Ill. |

[54] INDUSTRIAL WATER TESTING DEVICE
3 Claims, 4 Drawing Figs.

[52] U.S. Cl.................................................... 324/30,
356/72, 356/208
[51] Int. Cl......................................................... G01n 27/42
[50] Field of Search........................................... 324/30, 65,
115; 356/208, 72, 137/93; 23/253 (A),
Inquired; 73/32,

[56] References Cited
UNITED STATES PATENTS
2,122,363   6/1938   Christie..................... 324/30

| 2,526,636 | 10/1950 | Colman........................ | 324/65UX |
| 2,550,936 | 5/1951 | Poirette....................... | 324/115X |
| 3,337,798 | 8/1967 | Twining....................... | 324/30X |
| 3,361,150 | 1/1968 | Horner......................... | 137/93 |

FOREIGN PATENTS
1,009,721   11/1965   Great Britain................   324/30

Primary Examiner—Michael J. Lynch
Attorney—Kinzer, Dorn & Zickert

ABSTRACT: Device for testing industrial waters to determine optical density and/or electrical conductivity, wherein the device is portable and operable from a self contained power source or conventional line voltage to provide direct readings of optical density and electrical conductivity. Selector switches on the device, together with a meter having interchangeable faces, facilitate quick changeover for testing of different water conditions.

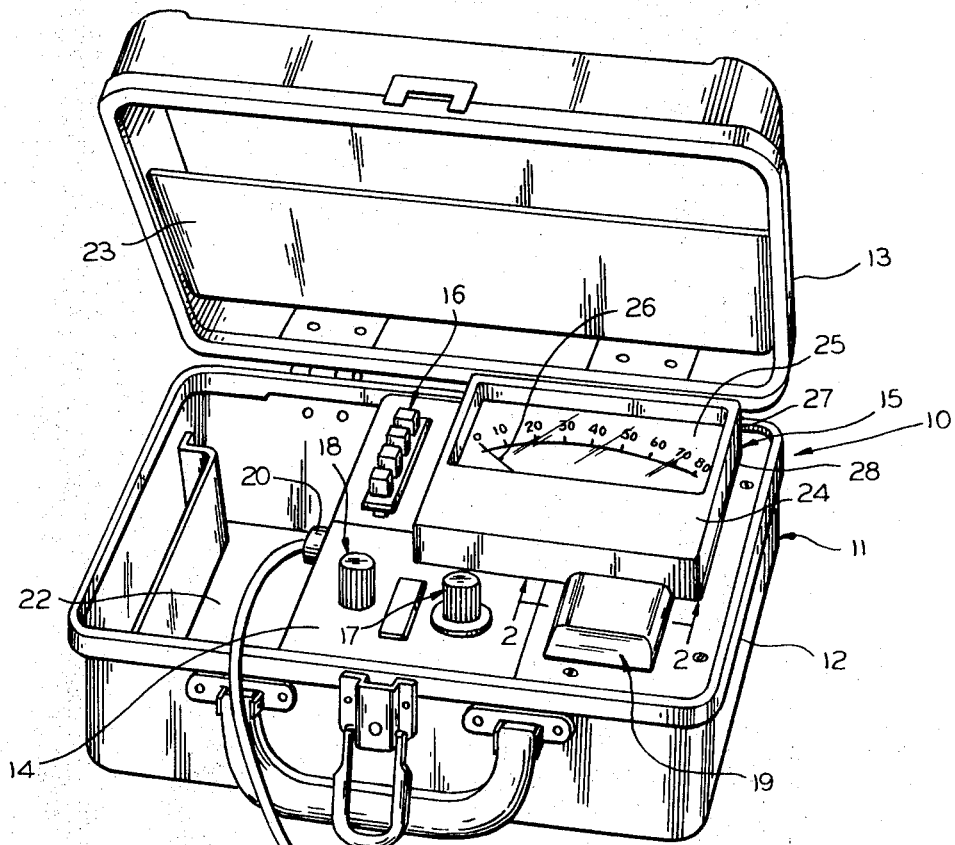
FIG.1
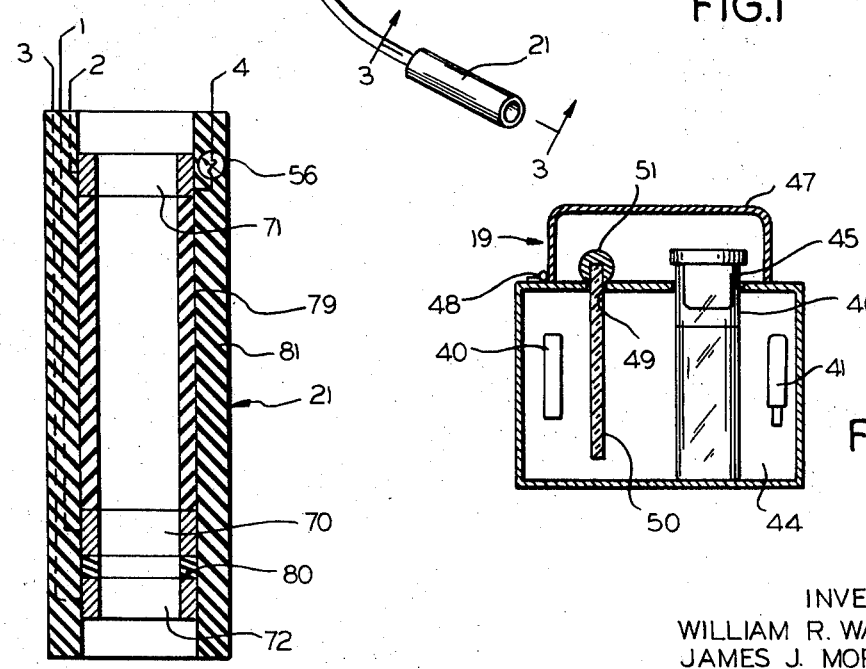
FIG.3
FIG.2
INVENTORS
WILLIAM R. WATSON
JAMES J. MORAN
BY
Kinzer, Dorn & Zickert
ATTORNEYS INVENTORS
WILLIAM R. WATSON
JAMES J. MORAN
BY
Kinzer, Dorn & Zickert
ATTORNEYS

INDUSTRIAL WATER TESTING DEVICE

This invention relates in general to a device for testing the conditions of solutions, and more particularly to a device for testing industrial waters to determine optical density and electrical conductivity.

The tester of the invention is particularly useful in testing boiler water to determine whether chemical additives, if any, need be injected into the water to bring the water condition to a suitable level for satisfactory operation within the boiler thereby enhancing the boiler life and operation. Water condition can be particularly determined by obtaining optical density and electrical conductivity readings. It should be recognized that the testing device may be employed for testing water used for other purposes or to determine in general the condition of certain waters. For example, it would be useful for testing feed waters used for cooling towers, or for determining the condition of polluted waters.

Heretofore, many testing devices have been developed and used for testing of industrial waters. For example, in boiler operations, individual testing devices have been employed for determining optical density and electrical conductivity, where a multistepped process has been necessitated, and many times the process necessitates interpretation of results on graphical plotted data.

The present invention provides a single instrument of compact size operable by self-contained power for providing quick and direct readout of industrial water condition. The device is provided in a small carrying case so that it is readily portable. A single meter having interchangeable faces to handle any type of test being made gives direct readout of water condition. An optical density circuit determines the optical density of the water being tested, wherein a photocell and light source therefore coacts with a sample of the water to give a direct readout on the meter. Selector switches permit conditioning of the tester to use an electrical conductivity circuit having a probe immersible in water. The same meter with a suitable face registers the electrical conductivity micromhos or parts per million of the total dissolved solids in the water. The circuitry is solid state, and may be selectively powered by rechargeable batteries or the conventional 110 volt AC power.

It is therefore an object of the present invention to provide a new and improved industrial water testing device for measuring optical density and/or electrical conductivity.

Another object of this invention is in the provision of an industrial water testing device having an optical density circuit with a photocell unit responsive to the optical density of the water being tested, and which may be adjusted by filter means to enhance sensitivity.

Another object of this invention is to provide an industrial water testing device for obtaining direct readings of optical density and/or electrical conductivity, where a meter having interchangeable precalibrated faces permits complete flexibility to determine the condition of the water being tested.

Another object of this invention resides in the provision of an industrial water testing device having an electrical conductivity circuit that is automatically temperature compensated so that direct readings may be taken from a meter on the device.

Still another object of this invention is in the provision of a dual constant conductivity probe for use in an electrical conductivity testing circuit for determining the electrical conductivity of industrial waters, thereby providing a wide range of testing operation.

Other objects, features and advantages of the invention will be apparent from the following detailed disclosure, taken in conjunction with the accompanying sheets of drawings, wherein like reference numerals refer to like parts, in which:

FIG. 1 is a perspective view of the testing device of the present invention;

FIG. 2 is an enlarged sectional view partially diagrammatic of the optical density testing chamber taken substantially along line 2–2 of FIG. 1;

FIG. 3 is an enlarged sectional view and partially diagrammatic of the probe, and taken substantially along line 3–3 of FIG. 1.

Figure 4:
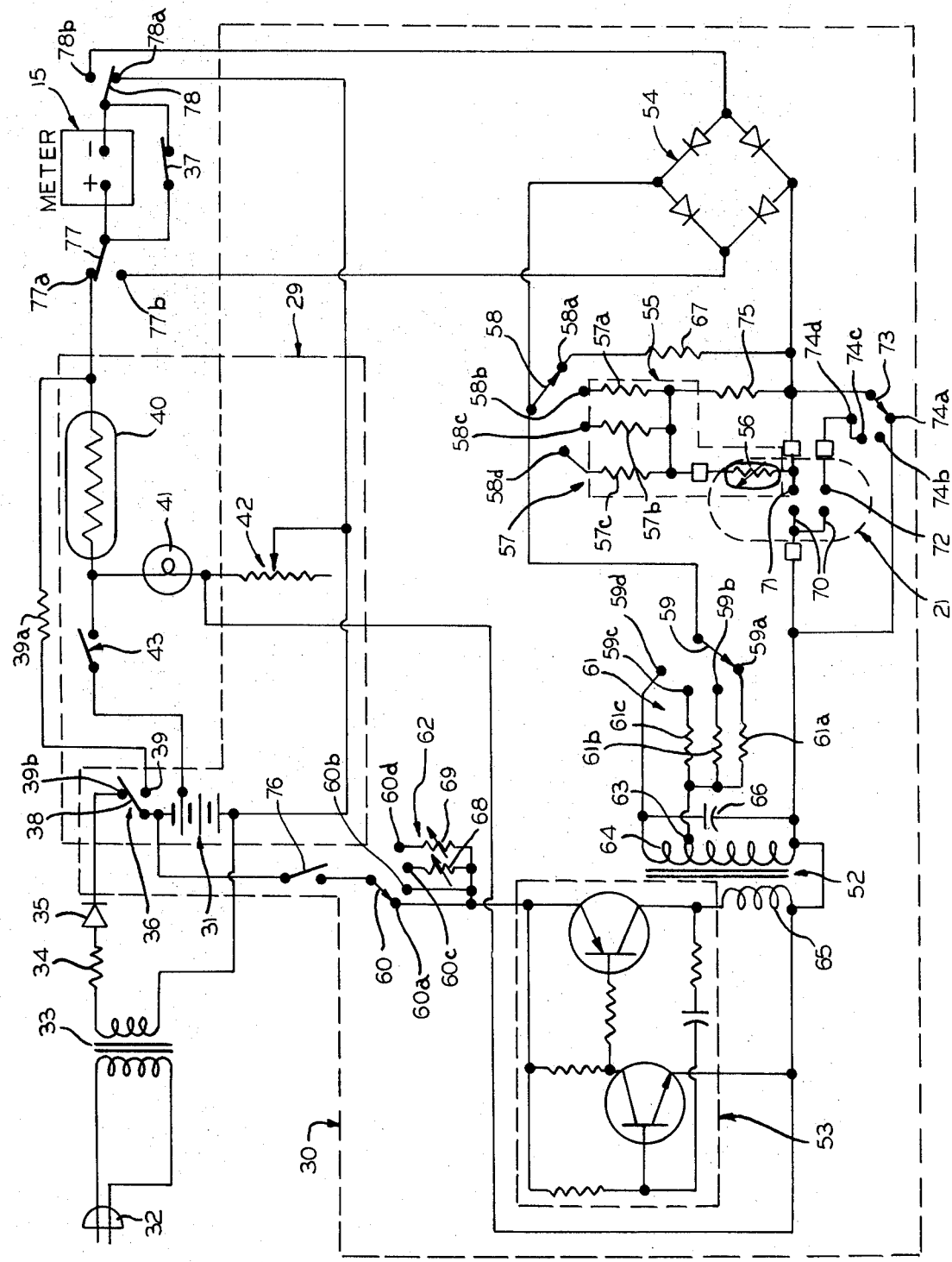
FIG. 4 is an electrical schematic diagram of the circuitry of the tester.

The testing device is mounted in a relatively small portable carrying case so that it may be transported by the user. The necessary equipment used with the tester is also stored in the carrying case, and this would include the conductivity probe, bottles or containers for positioning samples of water to be tested in the optical density testing chamber, and interchangeable meter faces. The meter which provides direct readout is selectively connected to the optical density circuit or the electrical conductivity circuit, and accordingly, conditioned with the appropriate meter face. The meter faces are precalibrated for use with the circuits and for testing the waters for the conditions desired. A zero set control adjusts the meter readily prior to a testing operation of either circuit. Direct current potential is applied to the optical density circuit to power same during its operation, and filter means may be provided to coact with a photocell and light source in filtering certain wave lengths of light energy emitted from the light source to enhance sensitivity in the testing of certain waters. An optical density chamber is provided for receiving the sample to be tested, wherein a cover member substantially closes the chamber to prevent stray light energy from influencing the measurement operation. A conductivity probe is employed with the electrical conductivity circuit which is immersible in the water to be tested and provided with dual constants to increase the range of operation. A thermistor is mounted in the probe and coacts with other components in the circuit to compensate for temperature differences in waters to be tested so that standard relative readings may be obtained. The probe is powered by an output from an oscillator or inverter that is in turn powered by the DC voltage of the battery or rectified AC voltage. The output of the probe is rectified and delivered to the meter. A range switch permits selecting different ranges for operation of the electrical conductivity circuit.

Referring now to the drawings and particularly to FIG. 1, the water testing device of the present invention generally indicated by the numeral 10, is shown mounted in a carrying case 11 having a base 12 and a cover 13. The testing device 10 includes an operating panel 14 having a readout meter 15 thereon, together with pushbutton selectors 16, a range and set knob 17, a zero set knob 18 and an optical density testing unit 19. The panel 14 serves to support the electrical circuitry components on the underside and has a downwardly extending portion with a socket for receiving the plug 20 of the conductivity probe 21. A compartment 22 in the base adjacent the panel 14 serves to store suitable equipment including the probe 21, water testing bottles, interchangeable meter faces, and other elements. Additional storage area is provided in the cover 13 behind a flap 23 for records or other items.

The meter 15 includes a bezel 24 having a window 25 through which the meter faces are visible as well as the pointer or indicator 26. A slot is provided in the side of the bezel at 27 to permit the sliding in and out of interchangeable meter faces 28. As above mentioned, the interchangeable meter faces are precalibrated to provide direct readouts for testing operations. The solid state circuitry of the tester includes an optical density circuit 29 and an electrical conductivity circuit 30, which are selectively connected to the meter 15 in accordance with the test being made. Each of the circuits are primarily powered by batteries 31 or AC line voltage connected to a plug 32. Preferably, the batteries are rechargeable such as of the nickel cadmium type, although it may be appreciated that conventional dry cells may be employed for power. When the tester is connected to AC line voltage, the voltage is stepped down at the transformer 33, further reduced by a resistor 34, and rectified by a diode 35 before being applied to the testing circuits. The transformer 33 also serves to isolate the testing circuitry. Rechargeable batteries 31 may be recharged by the AC line voltage when the circuitry is in the state shown, where neither of the testing circuits are energized, or when either of the testing circuits are energized and during testing operations.

Since it is mandatory that a minimum charge state be presented in the batteries when used for either of the circuits, a battery condition circuit is provided to obtain a reading on the meter 15. Testing of the battery condition is accomplished by actuating switches 36 and 37, where the switch arm 38 of switch 36 is switched to engage switch contact 39, and switch 37 which shunts the meter when closed, is opened. When the switch 36 is switched to connect just the battery to the meter, a resistor 39a is placed in series with the meter and battery to prevent full battery voltage from being placed across the meter. A battery condition mark is provided on each of the interchangeable meter faces to indicate the minimum battery condition acceptable for operating circuits. Following the testing of the battery condition, the switch 36 is actuated to bring the switch arm 38 back into engagement with switch contact 39b, and the switch 37 is closed.

The optical density circuit 29 includes a photocell 40 of the cadmium sulfide or other suitable type and a light source 41. A zero set potentiometer 42 operable from the zero set know 18 controls the intensity of the light source 41 in accordance with a zero mark on the meter face employed in the meter 15 to initially set the instrument for conducting the desired optical density test. The intensity of the lamp or light source 41 is adjusted by adjusting the voltage applied to it by the batteries 31. Depending upon the optical density of the water being tested, the photocell 40 will respond to the light energy impinging thereon for controlling the current passed through the meter 15 and thereby controlling the position of the indicator or pointer. Operation of the optical density circuit is accomplished by actuating the proper pushbutton selector 16 which opens the switch 37 and meter shunt circuit and closes the switch 43, thereby energizing the light source 41.

As seen in FIG. 2, the optical density testing unit 19 includes an optical density testing chamber 44 within which the photocell 40 and light source 41 are arranged in spaced relation. A hole 45 is provided in the upper wall of the chamber 44 to permit the insertion of a bottle 46 containing the water to be tested. It will be appreciated that the bottle 46 will be of transparent material such as clear glass or plastic and which will not have optical interfering characteristics. The bottle may be inserted to rest on the bottom wall of the chamber, and in order to prevent stray light energy from interfering with the testing operation, a cover member 47 is positioned over the upper end of the bottle and the opening 45. The cover member 47 is suitably hinged at 48 to facilitate its swinging between an open and closed position to permit insertion and withdrawal of a bottled sample of water.

Inasmuch as density measurement accurateness can be substantially improved when measuring the optical density of certain waters, means are provided for filtering some of the light energy from the source 41, wherein a slot 49 is provided in the upper wall of the testing chamber 44 to permit the insertion of a filter 50 between the photocell 40 and the bottled sample 46. It should be appreciated that the filter could be placed between the light source and the bottled sample. Such a filter is for example desired when measuring the density of reddish water, although it should be appreciated that it may be employed whenever desired. In the illustrated testing unit 19, a suitable gripping bead 51 may be provided at the upper end of the filter 50 to facilitate handling and to support the filter in position in the compartment. It should be appreciated that the filter 50 may be made of glass or any other suitable material of such substance to perform the desired action. In place of a separate filter, the bottle may be of material that will filter the light energy. For example, colored instead of clear bottles may be used.

The conductivity circuit 30 includes generally the conductivity probe 21 receiving an AC input voltage through a transformer 52 from an oscillator or inverter 53 that is in turn powered by the batteries 31 or the rectified AC line voltage.

The output of the probe 21 is measured by the meter 15 after being rectified at the meter rectifier 54. A temperature compensating circuit 55 automatically adjusts the reading of the meter to a predetermined standard whatever the temperature of the sample being tested.

The temperature compensating circuit 55 includes a thermistor 56 mounted directly in the probe, and a bank of three resistors 57, only one of which is placed in series with the thermistor during any testing operation depending upon the range selected. A range and set switch actuated by the range and set knob 17 includes switch arms 58, 59, 60 and 73 respectively associated with the bank of resistors 57, a bank of resistors 61, and a bank of calibrating resistors 62. The switch arms move in unison, wherein switch arm 58 is shown in engagement with contact 58a, switch arm 59 is shown in engagement with contact 59a, and switch arm 60 is shown in engagement with contact 60a, and 73 with 74a, which represents the set position for preadjusting the meter 15 with the zero set potentiometer 42. When the switch arm 58 successively switches to contacts 58b, 58c and 58 d, resistors 57a, 57b and 57c are respectively connected in series with the thermistor 56 to adjust the temperature compensating circuit 55 in accordance with the range of operation of the circuit. In this respect, the range switch permits measurement of conductivity on a micromhos scale, although the scale ranges may be otherwise chosen if desired. Moreover, any other suitable unit of measurement may be used.

In the set position, the switch arm 59 engages the switch contact 59a and connects the resistor 61a in series with the AC voltage supply from the transformer 52 to the conductivity probe 21. Varying voltages are applied to the conductivity probe when switching the arm 59 to contacts 59b, 59c and 59d. Engagement of contact 59b connects resistor 61b in series with the AC voltage supply, while engagement of contact 59c connects resistor 61c in series with the voltage supply. Engagement of the contact 59d connects the entire voltage supply of the transformer 52 to the conductivity probe. It should be noted that the resistor 61a, 61b and 61c are connected in common at one end and to a tap 63 on the output winding 64 of the transformer 52. Inasmuch as the input winding 65 is smaller that the output winding, it will be appreciated that this transformer steps up the voltage received from the oscillator 53. A filtering capacitor 66 is connected across the output winding 64. In the set position of the range and set switch, it should be appreciated that the switch arm 58 in engagement with the contact 58a bypasses the probe 21 and connects in a resistor 67 to the meter circuit for permitting operation of the zero set switch 42.

The switch arm 60 is shown in the set position in engagement with the contact 60a, and swings to contacts 60 b, 60c and 60d during operation of the range and set selection switch to respectively connect in series with the DC battery supply voltage at contact 60c and 60d adjustable calibrating resistors 68 and 69. When the arm is set at contact 60c or 60d, the voltage of the batteries 31 as supplied to the oscillator 53 is reduced according to the calibration of these resistors.

The conductivity probe 21 includes electrodes 70, 71 and 72 thereby defining a dual constant conductivity probe facilitating good range selection in operation. The thermistor 56 is connected between the electrode 71 and the bank of resistors 57 of the temperature compensating circuit, and the electrode 71 is also connected to one side of the meter rectifier 54. The electrode 70 is connected to one side of the output winding 64 of the transformer 52. Thus, the electrodes 70 and 71 are always in the circuit. Electrode 72 is selectively placed in the circuit between one side of the transformer output winding 64 and one side of the meter rectifier 54 when switch arm 73 engages contacts 74c and 74d. When the switch arm 73 engages contacts 74a, it is in the set position and serves to facilitate bypass of the probe for zeroing the meter. A thermistor shunt resistor 75 is connected in parallel to thermistor 56.

To place the conductivity circuit 30 into operation, the appropriate pushbutton selector 16 is actuated which simultaneously opens switch 37 and the meter shunt circuit, closes switch 76, swings switch arm 77 from contact 77a to engage contact 77b, and swings switch arm 78 from contact 78a to engage contact 78b. This connects the meter 15 into the conductivity circuit so that an electrical conductivity measurement can be made. It should be appreciated that the optical density circuit 29 is then no longer in operation or connected to the meter 15. After inserting the appropriate meter face into the meter 15, with the range and set knob 17 positioned to have the range and set switch in the "set" position as illustrated by the positions shown for switch arms 58, 59, 60 and 73, the zero set switch knob 18 is operated to actuate the zero set potentiometer 42 to bring the pointer of the meter in line with the set mark on the meter face. Thereafter, the appropriate range of conductivity to be measured is selected by operating the range and set switch, whereby the switch arms 58, 59, 60 and 73 move in unison to the various contacts. The temperature compensating circuit 55 compensates for temperature changes in the water being tested. It is known that as water temperature increases, conductivity increases. Accordingly, the thermistor resistance decreases as the temperature increases to shunt down the meter and thereby compensate for temperature changes.

A form of the probe is illustrated in FIG. 3, wherein the electrodes 70, 71 and 72 are shown in the form of rings. The ring-shaped electrodes are axially aligned, wherein the electrodes 70 and 71 are axially spaced by a spacer 79 of insulating material.

A similar spacer 80 of insulating material spaces the electrodes 70 and 72. The electrodes and spacers are held together by an annular body 81 of insulating material, which is open at the upper and lower ends to provide the passing of the water to be tested so that the water may contact the electrodes. It should be appreciated that the probe may easily be cleaned by running a brush therethrough so that it can be maintained in good operating condition with little maintenance.

It will be understood that modifications and variations may be effected without departing from the scope of the novel concepts of the present invention.

This invention we hereby claim as follows:

1. An industrial water testing device for determining conductivity and optical density comprising a meter with interchangeable faces, one face being for measuring optical density and the other faces being for measuring conductivity, a conductivity circuit adapted to be connected to said meter and including a probe for immersion in the the water to be tested, said probe having a plurality of electrodes for measuring water resistance and producing an electrical signal for said meter proportional to the conductivity of the water being tested, means connected in said conductivity circuit automatically compensating for temperature variations in the waters tested, an optical density circuit adapted to be connected to the meter and including a photocell connected in the optical density circuit and coacting with a light source to detect the optical density of the water to be tested as it is interposed therebetween in a transparent container, said photocell producing an electrical signal for the meter proportional to the light energy impinging thereon in accordance with the optical density of the water tested, common adjustable resistance means connected in said circuits to zero said meter prior to a testing operation, and switching means for selectively connecting one of said circuits to said meter at one time.

2. The combination as defined in claim 1, wherein said temperature compensating means includes a thermistor mounted in said probe.

3. The combination as defined in claim 1, wherein said probe includes first, second and third electrodes, said first and second electrodes spaced apart a predetermined distance to define a first cell having a given cell constant and said first and third electrodes spaced apart a different distance to define a second cell having a second given cell constant, and means selectively connecting one of said cells to said conductivity circuit.